(12) United States Patent
Olep et al.

(10) Patent No.: US 7,918,491 B2
(45) Date of Patent: Apr. 5, 2011

(54) ADAPTABLE VISOR FOR VEHICLES

(75) Inventors: Kirk J. Olep, Hudsonville, MI (US);
Kipp R. Hofmeyer, Holland, MI (US);
Matt S. Whalen, Allendale, MI (US)

(73) Assignee: Johnson Controls Technology Company, Holland, MI (US)

( * ) Notice: Subject to any disclaimer, the term of this patent is extended or adjusted under 35 U.S.C. 154(b) by 67 days.

(21) Appl. No.: 11/989,470

(22) PCT Filed: Jul. 27, 2006

(86) PCT No.: PCT/US2006/029490
§ 371 (c)(1),
(2), (4) Date: Jan. 25, 2008

(87) PCT Pub. No.: WO2007/016375
PCT Pub. Date: Feb. 8, 2007

(65) Prior Publication Data
US 2009/0315360 A1    Dec. 24, 2009

Related U.S. Application Data

(60) Provisional application No. 60/703,152, filed on Jul. 28, 2005.

(51) Int. Cl.
*B60J 3/02* (2006.01)

(52) U.S. Cl. .................................. 296/97.8; 296/97.1
(58) Field of Classification Search ............... 296/97.1, 296/97.8
See application file for complete search history.

(56) References Cited

U.S. PATENT DOCUMENTS

| 6,086,132 A * | 7/2000 | Larson et al. ............... 296/97.6 |
| 6,488,328 B2 | 12/2002 | Quapil |
| 6,543,832 B1 | 4/2003 | Bogdanski et al. |
| 6,557,920 B1 | 5/2003 | Hobson et al. |
| 2002/0121796 A1 | 9/2002 | Bauer et al. |
| 2005/0127704 A1 | 6/2005 | Tiesler |

FOREIGN PATENT DOCUMENTS

| DE | 88 16 095 | 2/1989 |
| DE | 198 50 791 A 1 | 8/2000 |
| EP | 1 164 037 A2 | 12/2001 |
| FR | 1 396 773 | 1/1965 |

* cited by examiner

*Primary Examiner* — Dennis H Pedder
(74) *Attorney, Agent, or Firm* — Foley & Lardner LLP

(57) ABSTRACT

An adaptable visor assembly includes a generally planar body portion having a lateral end. An ear segment is removably attachable to the body portion at the lateral end via an interface. The interface includes a projection configured to engage a receptacle when the ear segment is attached to the body portion.

9 Claims, 7 Drawing Sheets

ADAPTABLE VISOR FOR VEHICLES

CROSS-REFERENCE TO RELATED PATENT APPLICATIONS

This Application is a National Phase of International Patent Application No. PCT/US2006/029490, filed Jul. 27, 2006, which claims the benefit of U.S. Provisional Application No. 60/703,152, filed Jul. 28, 2005. The contents of these applications are incorporated herein by reference in their entireties.

FIELD

The present invention relates generally to a visor for use in vehicles. More specifically, the present invention relates to visors for vehicles (or other applications) having attachable or extendable segments for adapting a common visor body for use with different vehicles and/or different applications within vehicles.

BACKGROUND

Visors for use in vehicles to shield an occupant from sunlight are generally known. Such visors generally have a shape and size intended to "fit" along a forward overhead area of a vehicle and are often deployable between a "stored" position along a headliner and a "use" position folded downward toward a windshield of the vehicle and typically pivotable between a frontal location along the windshield and a lateral location along a side window to improve the utility of the visor in shielding an occupant of the vehicle from external light sources. Such visors are often sized according to the size of a particular vehicle and more particularly are typically sized to fit between an A pillar and a rearview mirror (e.g. located centrally at an upper region of the windshield, etc.).

However, recent trends in vehicle design tend to emphasize increased amounts of head protection countermeasure material or other safety devices such as airbags along a backside of the headliner and other design changes (such as vehicle contour and styling) that tend to decrease the available "packaging" space for a visor located between the A pillar and the rearview mirror. Despite such decreased available space for a visor, there remains a need to provide a visor that provides an expansive amount of surface area coverage to provide desired sun-blocking capability.

One attempt to improve visors to fit within a reduced packaging space, yet retain maximum surface area involved including a side flap (e.g. "ear" etc.) that may be flexible within a certain limited range (e.g. about 0-15 degrees from the plane of the visor to resolve potential interference with A pillars, headliner panels, etc.) however, degradation of the visors typically begins to occur at a certain point (e.g. about 7-10 degrees), such as wrinkling or bunching of fabric or vinyl coverings on the visor, baggy or bridging fabric coverings on the visor, compressed fabric on the headliner panel, weak visor detents (intended to maintain the visor in a desired position, thus requiring stronger springs, etc.), and the like. One attempt to address the issue of visor "ear" segments that become excessively distorted when forced into service in applications with reduced space is to provide a pre-shaped ear having the necessary bend for use in the intended application that is integrally formed with the visor body. However, such typical visor body materials and formation technologies are often not readily adaptable (or sufficiently cost effective) for production of a visor ear having the necessary degree of curvature to interface with an A pillar or headliner panel (or other vehicle component).

Accordingly, it would be desirable to provide a visor that is adaptable for use in various vehicles having varying degrees of available space for placement and operation of the visor. It would be desirable to provide an adaptable visor having a body portion (e.g. primary piece) and an attachable ear segment(s) (e.g. secondary piece). It would also be desirable to provide a visor for a vehicle having an ear segment(s) that may be pre-formed into any desired size and shape (e.g. flat, curved, contoured to conform with A pillars, headliner panels, etc.) and attached to a lateral end of the visor body to suit the space available in any one of a variety of different vehicle applications. It would also be desirable to provide a visor for vehicles having an ear segment(s) that attaches to the visor body by snap-fit, push-fit, press-fit or other suitable process that permits rapid and inexpensive attachment of any particular ear segment onto a common visor body for adaptation to a particular vehicle. It would be desirable to provide an adaptable visor for a vehicle where the visor body is formed as a generally flat panel and the ear segment(s) is formed as a curved or contoured member. It would also be desirable to provide the ear segment(s) with a surface finish such as grained, filmed, fabric, printed or other suitable finish to match (or contrast) the finish on the visor body (or other vehicle interior trim component). It would also be desirable to form additional features (e.g. ticket clips, bumpers, holders, compartments, etc.) on the ear segment(s) to improve the utility of the adaptable visor. It would be further desirable to provide an adaptable visor having an ear segment(s) formed in any one of a blow molding process, injection molding process, co-injection process or other suitable process. It would be further desirable to provide an adaptable visor having an ear segment(s) that is pivotally extendable from and retractable within a portion of the visor body for adapting the visor body for use with a wide variety of vehicles.

Accordingly, it would be desirable to provide an adaptable visor for vehicles having any one or more of these or other advantageous features.

SUMMARY

One embodiment of the invention relates to an adaptable visor assembly. The visor includes a generally planar body having a lateral end and an ear segment removably attachable to the lateral end via an interface. The interface includes a projection configured to engage a receptacle when the ear segment is attached to the body portion.

Another embodiment of the invention relates to an adaptable visor assembly. The visor includes a generally planar body portion having a lateral end. The visor also includes an ear segment coupled to the body portion at the lateral end via an interface such that the ear segment pivots from a stowed position within a recess in the body portion to a use position.

Yet another embodiment of the invention relates to an adaptable visor assembly. The visor assembly includes a generally planar body portion having a lateral end. The visor assembly also includes a first ear segment and a second ear segment. The first ear segment and the second ear segment are interchangeably attachable to the body portion at the lateral end, and differ in at least one of a size and a shape.

DETAILED DESCRIPTION

The FIGURES illustrate various embodiments of a component or assembly such as a visor for use in a vehicle (e.g., automobiles such as cars, trucks, SUVs; buses; recreational vehicles and the like; airplanes; boats; etc.). Such components may be provided in a wide variety of sizes, shapes, materials and configurations according to various exemplary embodiments. According to the illustrated embodiments, a visor is shown to have a body portion (primary piece) and at least one attachable extension member (shown as an "ear segment" or secondary piece) for customizing a generally common-sized body portion for use in a variety of different vehicle applications. The body portion and ear segment are shown for example as having nesting or interconnecting structure. However, according to alternative embodiments, the body portion and ear segment may have any suitable shape, size and attachment structure for interconnection to form an adaptable visor assembly for any suitable application. Further, the ear segment(s) may have any suitable size, shape and contour, and may be a unitary piece or formed from two or more pieces having connecting structure to form an ear segment assembly. The ear segment(s) may be provided as a generally "flat" or "contoured" member and may be generally rigid or flexible. Further, the ear segment(s) may be configured to attach to one or both lateral ends of the visor body portion. Accordingly, all such alternatives are intended to be within the scope of the embodiments described herein.

Conventional visors are often provided with, for example, a laterally extending flap integrally formed with a body portion of the visor. Such conventional visors typically include an internal hinge or other joint that permits limited flexibility or "bending" (such that the flap may be deflected relative to the body portion), but tend to result in creases, bridging and/or bagginess of the cover material adjacent to the bending locations. According to one example of a conventional visor flap, degradation in the appearance of quality of the visor begins to occur when the flap is bent about 10 degrees or more from the plane of the visor body portion.

Figure 1:
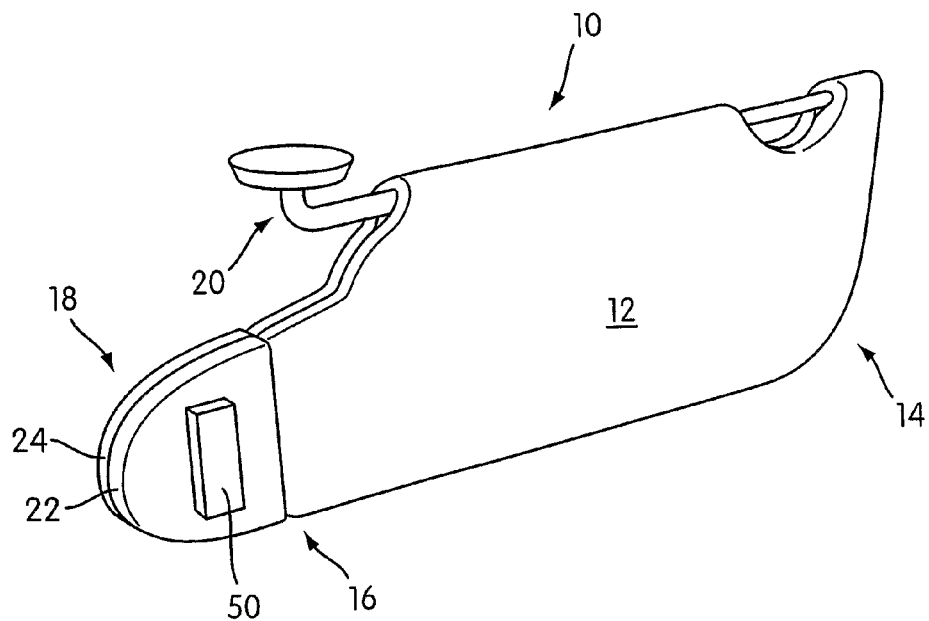
FIG. 1 is a perspective view of an adaptable visor according to an exemplary embodiment.
Figure 2:
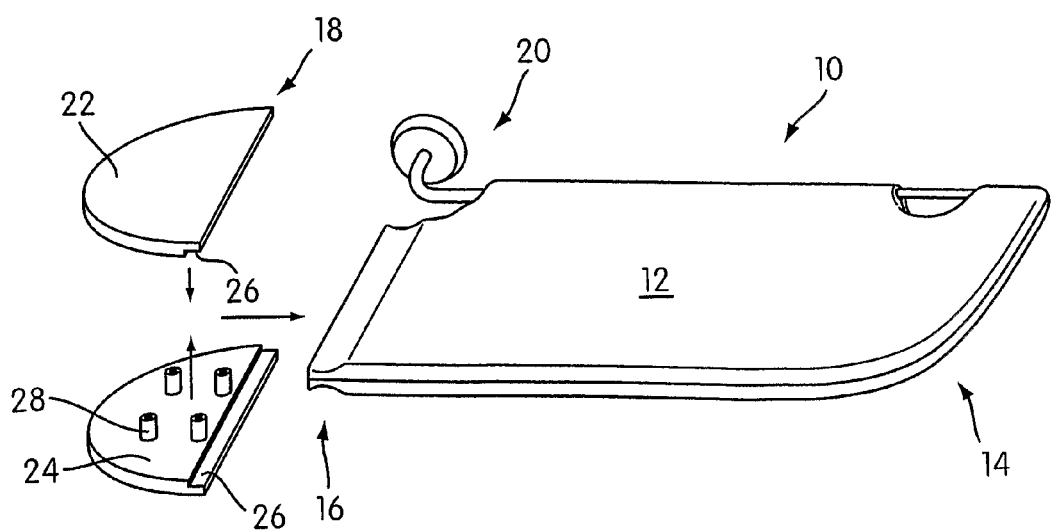
FIG. 2 is a partially exploded view of an adaptable visor according to an exemplary embodiment.
Figure 3:
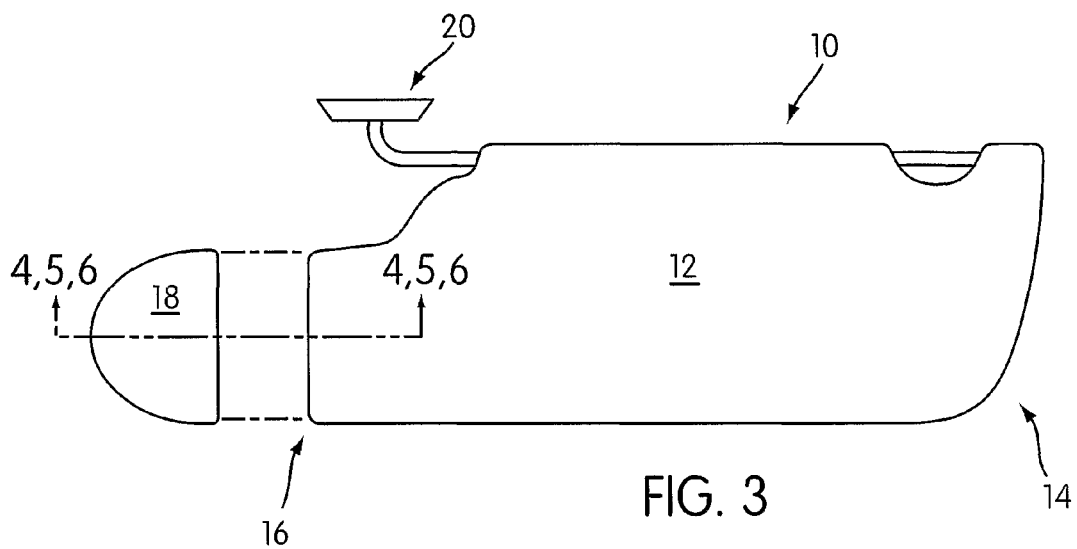
FIG. 3 is a front view of an adaptable visor according to an exemplary embodiment.

Referring to FIGS. 1-3, one embodiment of an adaptable visor 10 for vehicles is shown that provides attachable structure intended to accommodate the reduced packaging space available within certain vehicles. Visor 10 is shown to include a visor body or body portion 12 having two lateral ends 14, 16 and an ear segment 18. Visor 10 is also shown to include structure 20 for mounting the visor to a vehicle, which may include an elbow mounting bracket, pivot rod, and Euro-pin; and may also include a slide mechanism, detent spring, and other features such as vanities, lights, communication devices, remote transmitters, etc. (not shown). In FIG. 2, ear segment 18 is shown as an assembly formed from two pieces 22, 24 (e.g. "halves" etc.) having connecting structure 26 configured to interconnect and attach to one or both lateral ends 14, 16 of visor body 10.

Referring further to FIG. 2, ear segment 18 is shown as a generally flat ear segment having connecting structure for connecting pieces 22, 24 to form ear segment 18 and having attachment structure 26 for attaching ear segment 18 to lateral end 16 of body portion 12. According to alternative embodiments, ear segment 18 may be formed from a single material, or two materials (e.g. in a co-molding process, etc.), and may be provided with a suitable cover material (e.g. fabric, vinyl, leather, etc.) or without a separate cover material.

Figure 4:
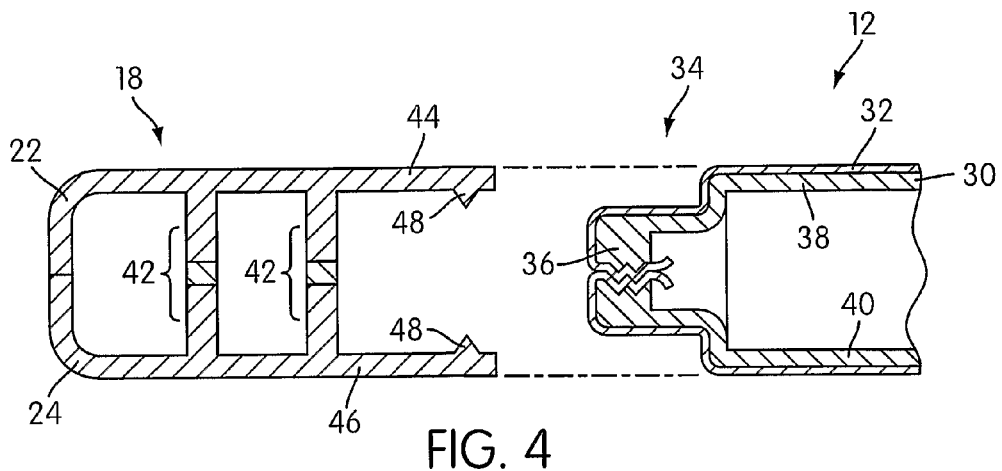
FIG. 4 is a sectional view of section 4-4 of FIG. 3 according to an exemplary embodiment.

Referring to FIGS. 4-9, various illustrative embodiments of an adaptable visor are illustrated. As shown in FIG. 4, body portion 12 may have a core material 30 and a cover material 32 formed into the shape of the visor (e.g. thermofolded, etc.) and includes a receiving area 34 along lateral end 16 having a reduced thickness for receiving ear segment 18. Lateral end 16 is shown with structure 36 to capture cover material 32 between panels 38, 40 of core material 30. According to the illustrated embodiment, structure 36 is shown as projections (e.g. "shark's teeth" etc.) formed into one or more of the inside surfaces of panels 38, 40 of core material 30 and is configured to grip and hold cover material 32. Ear segment 18 includes connecting structure 42 that interconnect pieces 22, 24 (e.g. by hot plate welding, or other suitable process) to form ear segment 18. Ear segment 18 also includes flanges 44, 46 having inside surfaces shown to include attachment structure, shown as projections 48 (e.g. "shark's teeth" etc.). Flanges 44, 46 are sized to "fit" over lateral end 16 of body portion 12 within receiving area 34 such that attachment structure 48 grips cover 32 and core material 30 of visor body portion 12 to secure ear segment 18 to the body portion (e.g., by way of a biased engagement). The thickness of flanges 44, 46 may correspond to the reduction in depth of receiving area 34 so that when ear segment 18 is attached to body portion 12, the parts form a substantially smooth and continuous surface that is aesthetically attractive and provides an appearance representative of good craftsmanship and quality.

Figure 5:
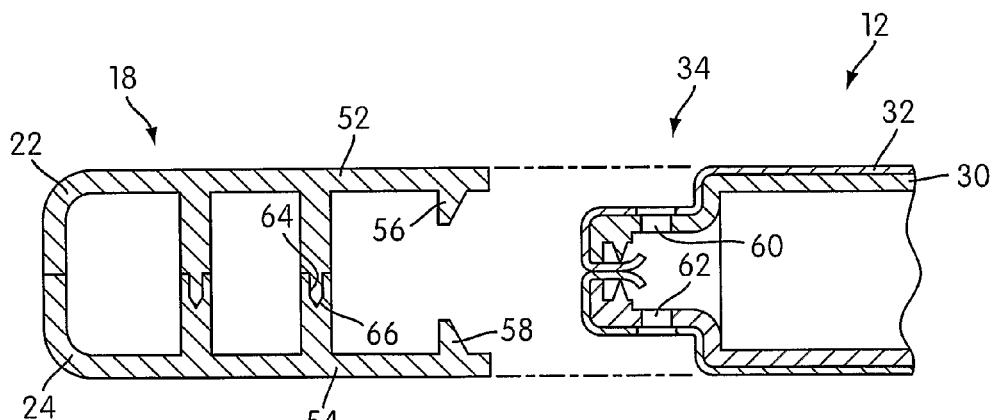
FIG. 5 is a sectional view of section 5-5 of FIG. 3 according to an exemplary embodiment.

Referring to FIG. 5, ear segment 18 is shown according to another embodiment. The inside surfaces of flanges 52, 54 of ear segment 18 are shown to include projections 56, 58 (e.g. posts, tabs, fingers, hooks, etc.) that are configured to engage corresponding apertures 60, 62 in cover material 32 and core material 30 of visor body portion 12 in a "snap-fit" retention arrangement to secure ear segment 18 to body portion 12. According to alternative embodiments, the attachment structure for the ear segment(s) may include any suitable structure for attaching ear segment 18 to body portion 12. For example, receiving area 34 and flanges 52, 54 may be sized for a press fit or interference fit, or other attachment materials such as adhesive(s) (or other suitable bonding agent), or fasteners (such as threaded fasteners, hook and loop fasteners, etc.) may be used. By further way of example, the attachment structure on the ear segment(s) and body portion may be reversed so that hooks provided on the body portion are configured to engage corresponding recesses, pockets or apertures on the ear segment(s) to secure the ear segment(s) to the body portion.

As also shown in FIG. 5, ear pieces 22, 24 may be joined using one or more projections 64 that are configured to mate with one or more corresponding recesses 66. The projections/recesses may be provided in either of pieces 22, 24 and may be of various configurations suitable to secure pieces 22, 24 together.

Figure 6:
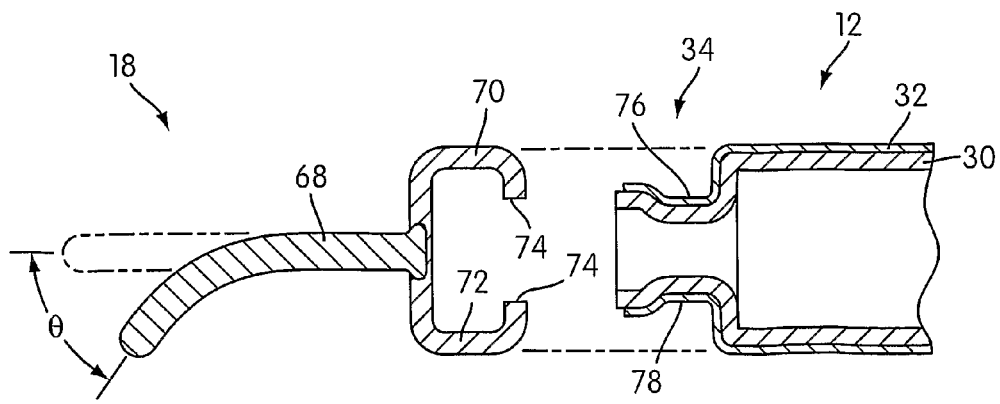
FIG. 6 is a sectional view of section 6-6 of FIG. 3 according to an exemplary embodiment.

Referring to FIG. 6, according to an alternative embodiment, ear segment 18 may be formed as an extension 68 having flanges 70, 72 (or the like) with attachment structure 74 configured to engage receiving area 34 of a lateral end (such as lateral end 16) of body portion 12. As shown in FIG. 6, attachment structure 74 may be a general "C" shape configured to "snap" into recesses 76, 78 provided in receiving area 34. As shown in FIG. 6, extension 68 may be flexible through an angle θ in either direction (relative to the straight position) so as to be able to easily conform to, for example, interior structure within a vehicle such as an A pillar, windshield, rearview mirror, etc. Extension 68 may be integrally formed as a part of ear segment 18, or may be attached as a part of a secondary operation to the remainder of ear segment 18. Further, flanges 70, 72 may be configured to engage recesses 76, 78 such that, in addition to ear segment 18 being secured to body portion 12, cover material 32 is also secured to core material 30.

Figure 7:
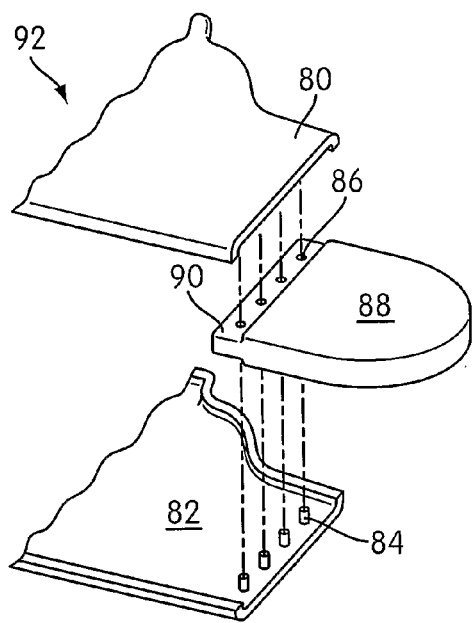
FIG. 7 is an exploded view of a portion of an adaptable visor according to an exemplary embodiment.

Referring to FIG. 7, an ear segment 88 is shown with attachment structure according to another alternative embodiment. As shown in FIG. 7, a visor body portion may be provided having two pieces 80, 82. Piece 82 may include projections, shown as pins or posts 84, that are configured to pass through holes 86 in ear segment 88. Holes 86 may be provided on a recessed portion 90 of ear segment 88 such that the overall contour of the visor is maintained across the top and bottom surfaces. Alternatively, ear segment 88 may be thinner or thicker than visor body portion 92 (when assembled.) Posts 84 may then be secured to the interior surface of piece 80, thereby securing ear segment 88 between pieces 80, 82.

Figure 8:
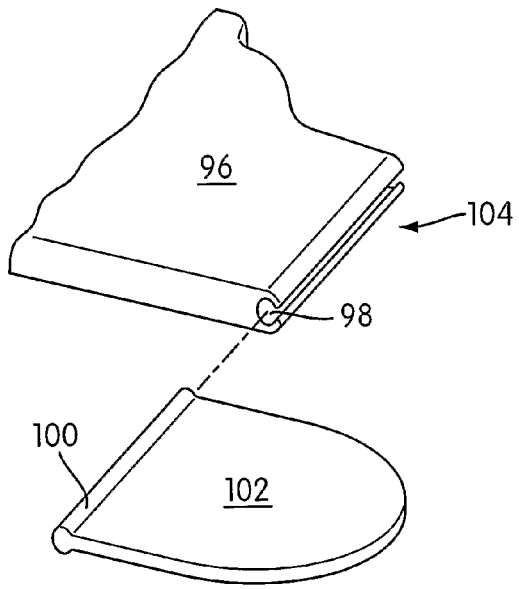
FIG. 8 is an exploded view of a portion of an adaptable visor according to an exemplary embodiment.

Referring to FIG. 8, an ear segment 102 is shown according to another alternative embodiment. As shown in FIG. 8, a visor body portion 96 may include a channel, or groove, 98 configured to receive a mating segment 100 of ear segment 102. Channel 98 and segment 100 may engage in a smooth fit, an interference fit, etc., and may be configured to be of various cross-sectional shapes/dimensions and varying lengths, etc. As shown in FIG. 8, channel 98 is a through-channel extending across the entire width of body portion 96. According to alternative embodiments, channel 96 may have one or more stopped ends, and may further be provided in multiple segments. Further yet, while segment 100 is shown as engaging channel 98 in a sliding engagement, segment 100 may rather be configured to engage channel 98 from an end portion 104 of body portion 96 in a "snap" type engagement. Other suitable configurations of channel 98 and/or segment 100 may alternatively be used.

Figure 9:
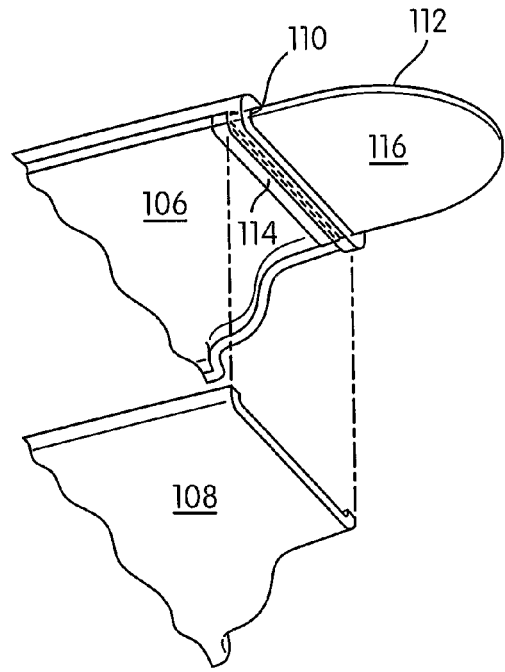
FIG. 9 is an exploded view of a portion of an adaptable visor according to an exemplary embodiment.

Referring to FIG. 9, an ear segment 112 is shown according to another alternative embodiment. As shown in FIG. 9, a visor body portion may be provided with two mating pieces 106, 108. Piece 106 may include an aperture 110 configured to allow a main portion 116 of ear segment 112 to pass through aperture 110, while retaining an enlarged, anchor portion 114. Upon assembling pieces 106 and 108, some or all of anchor portion 114 is contained within pieces 106, 108 (e.g., not visible via the exterior), and main portion 116 extends outward from aperture 110. As shown in FIG. 9, main portion 116 may be slid through aperture 110. According to an alternative embodiment, rather than an aperture such as aperture 110, piece 106 may be provided with a shoulder (e.g., one half of the structure defining aperture 110), such that ear segment 112 may be laid onto piece 106 prior to assembly. This may allow main portion 116 to maintain an essentially constant surface with pieces 106, 108 upon assembly. Other ways of securing ear segment 116 to pieces 106, 108 may alternatively be used.

Figure 10:
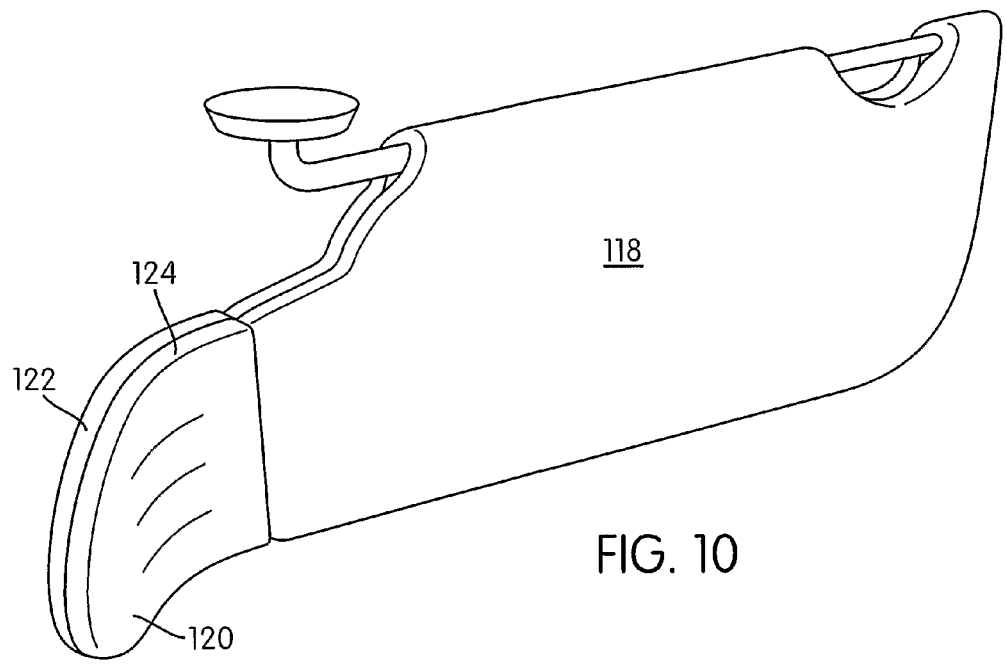
FIG. 10 is a perspective view of an adaptable visor according to an exemplary embodiment.

As illustrated with respect to FIGS. 1-9, the various ear segments are depicted as being generally flat in shape. It should be understood, however, that the ear segment may alternatively be provided in a variety of configurations. For example, in addition to a single or two-piece, rigid or semi-rigid, straight ear segment, the ear segment may be contoured into the shape of a curve (as shown in FIG. 10), the curve being in the general shape of a "C" or "S" or any other suitable contour to conform to, or cooperate with, other structures along the boundaries of the packaging area (such as A pillars, headliner panels, rearview mirrors, etc.). The contoured ear segment may be formed from one unitary piece or may be formed in two or more pieces configured to interconnect to form a contoured ear segment assembly (as previously described for the "flat" ear segment). For example, referring to FIG. 10, a contoured ear segment 120 may be provided with structure similar to structure 26 shown in FIG. 2. Ear segment 120 may be a two-piece assembly, including ear segment pieces 122, 124, having connecting structure such as posts with male/female "snaps" for connecting the two halves (e.g. an upper ear piece and a lower ear piece) into the contoured ear segment assembly, which may be attached to the receiving area at a lateral end of a visor body portion 118 (as previously described). According to any alternative embodiment, the ear segment(s) may be formed having any desirable contour, in two or three dimensions, to suit a particular application.

Figure 11:
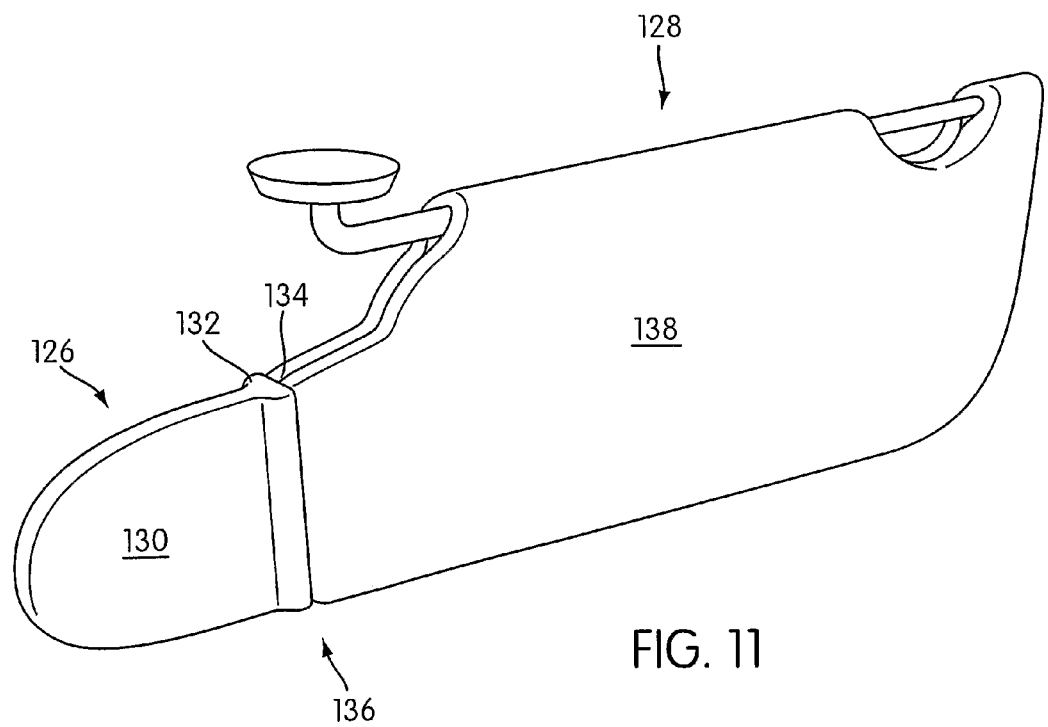
FIG. 11 is a perspective view of an adaptable visor according to an exemplary embodiment.

Referring to FIG. 11, another embodiment of an ear segment 126 for use with an adaptable visor 128 is shown. Ear segment 126 is shown to include a single panel 130 (e.g. flap, wing, etc.) that is intended to be flexible so that it "yields" or otherwise compliantly accommodates other fixed structures located along the boundaries of the packaging space for the visor. Ear segment 126 may be formed from rubber or other suitable material having the desired flexibility and resiliency so that it tends to return to original shape or position when the visor is repositioned between the stowed position and the use position. The ear segment is formed with flanges 132, 134 that are configured for attachment to a receiving area 136 at a lateral end of the visor body portion 138, such as previously described with respect to FIGS. 4-9.

Figure 12:
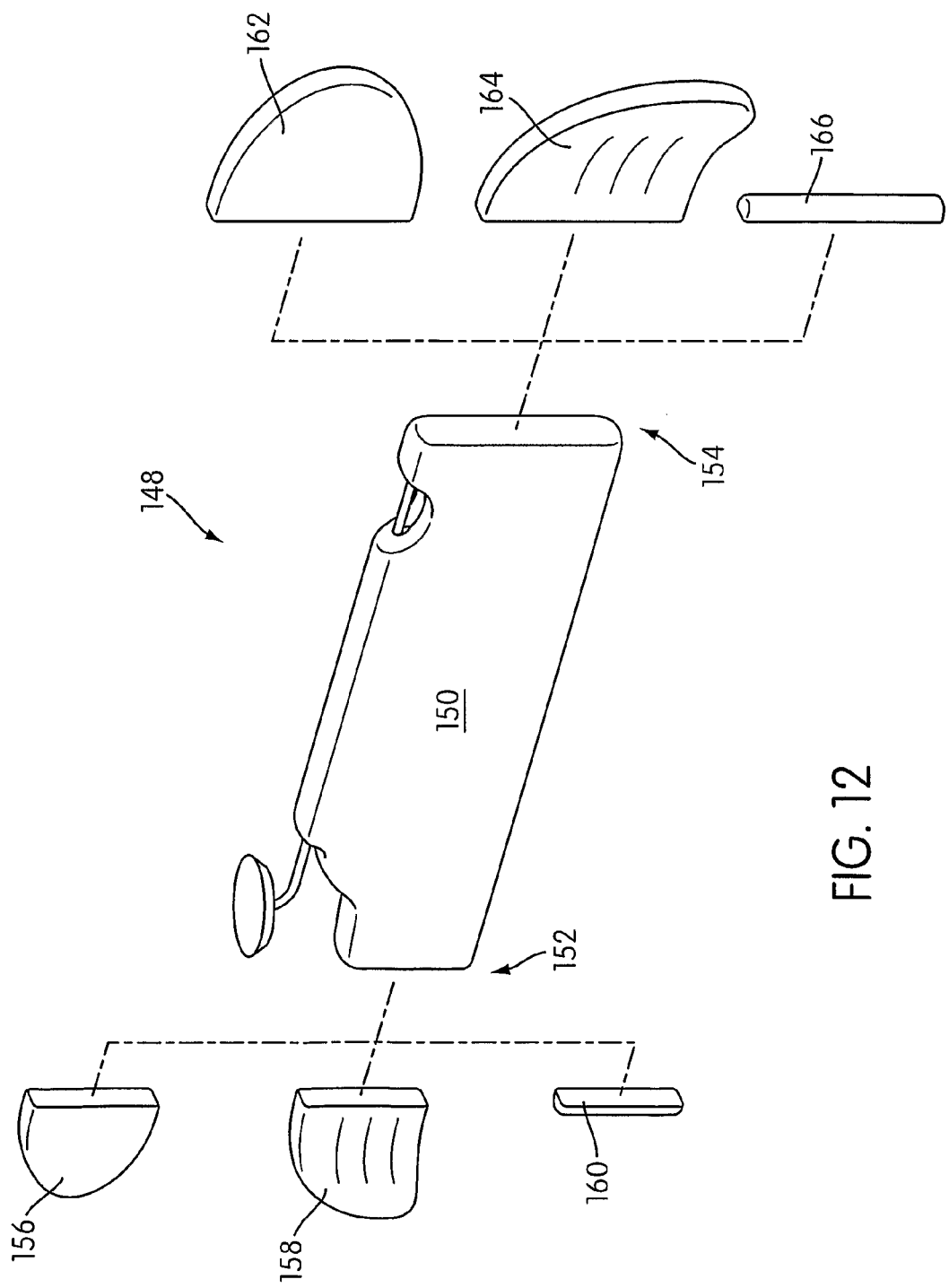
FIG. 12 is a perspective view of an adaptable visor according to an exemplary embodiment.

Referring now to FIG. 12, according to another embodiment, one or more ear segments may be formed having various sizes, shapes and contours intended to custom "fit" various applications, but having a generally "standardized" or "common" flange area and attachment structure for adapting the various ear segments to the receiving area at a lateral end of a generally standardized body portion, so that an adaptable visor can be used in a wide variety of applications by selecting and attaching a suitable ear segment to a "standard" body panel. Also, in order to increase the utility of the adaptable visor, the body portion may be provided in several "standard" sizes (e.g. small, standard, large, etc.) to increase the available adaptable visors that may be formed from any combination of ear segments and body portions. The body portion may be provided with a receiving area at one lateral end or at both lateral ends to maximize the options for customizing the adaptable visor. A trim piece (e.g. strip, close-out piece, etc.)

may be provided to "close-out" a receiving area of a body portion when no ear segment is intended to be attached. Further, the adaptable visor can be produced for interchangeable use on either "side" (e.g. driver side or passenger side) of the vehicle, by attaching the ear segment to the body portion in a reverse-180 degree orientation.

Referring further to FIG. 12, an adaptable visor for vehicles having a body portion and at least one ear segment is shown according to various exemplary embodiments. As shown in FIG. 12, a visor body portion 150 may include one or more receiving areas 152, 154 for receiving one or more ear segments. Various ear segments 156, 158 and 162, 164 may be provided that are interchangeable with one or more receiving areas 152, 154 of body portion 150. Further, a trim piece 160, 166 may be provided to close out a receiving area 152, 154 when an ear segment is not used. According to another embodiment, body portion 150 and receiving areas 152, 154 may be provided such that if additional coverage is not required or desired, no trim piece is required, and the adaptable visor assembly may be used without an ear segment or trim piece. As shown in FIG. 12, the various components of adaptable visor 148 provide for a number of combinations adaptable to various vehicle types and sizes.

For example, in a "small" vehicle, adaptable visor 148 may include body portion 150 without an ear segment, such as where body portion 150 alone has sufficient coverage area to occupy the packaging space. In such a case, trim strip 160, 166 or the like may be configured to fit over and close-out receiving area 152, 154 at the lateral end(s) of visor body portion 150.

According to another embodiment, for a "standard" size vehicle, adaptable visor 148 may include generally flat ear segment 156 in a first size and shape that attaches to a lateral end of visor body portion 150 (e.g., at the lateral end toward an A pillar) to provide the desired visor coverage area. Alternatively, adaptable visor 148 may include contoured ear segment 158 in a first size and shape that attaches to a lateral end of visor body portion 150 (e.g., at a lateral end toward an A pillar) to provide the desired visor coverage area and accommodate vehicle structure along a boundary of the packaging space.

According to another embodiment, for a "standard" size vehicle, adaptable visor 148 may include generally flat ear segment 162 in a second size and shape that attaches to a lateral end of visor body portion 150 (shown for example as the lateral end toward a rear view mirror) to provide the desired visor coverage area. Alternatively adaptable visor 148 includes contoured ear segment 164 in a second size and shape that attaches to a lateral end of visor body portion 150 (shown for example as the lateral end toward a rear view mirror) to provide the desired visor coverage area and accommodate vehicle structure along a boundary of the packaging space.

According to a further embodiment, for a "large" size vehicle, adaptable visor 148 may include flat ear segment 156 that attaches to the lateral end toward an A pillar and another flat ear segment 162 that attaches to the lateral end toward a rearview mirror to provide the desired visor coverage area with common body portion 150 and accommodate vehicle structure along a boundary of the packaging space. According to an alternative embodiment, one or both of the ear segments may be contoured, or provided in any of a variety of shapes and sizes to adapt the visor to any particular application.

It should be understood that the various embodiments discussed herein with respect to FIG. 12 are illustrative only, and that other visor body shapes and sizes, other ear segment and/or trim piece shapes and sizes, and other combinations of visor body portions and ear segments/trim pieces are possible utilizing the adaptable visor assembly described herein.

Figure 13:
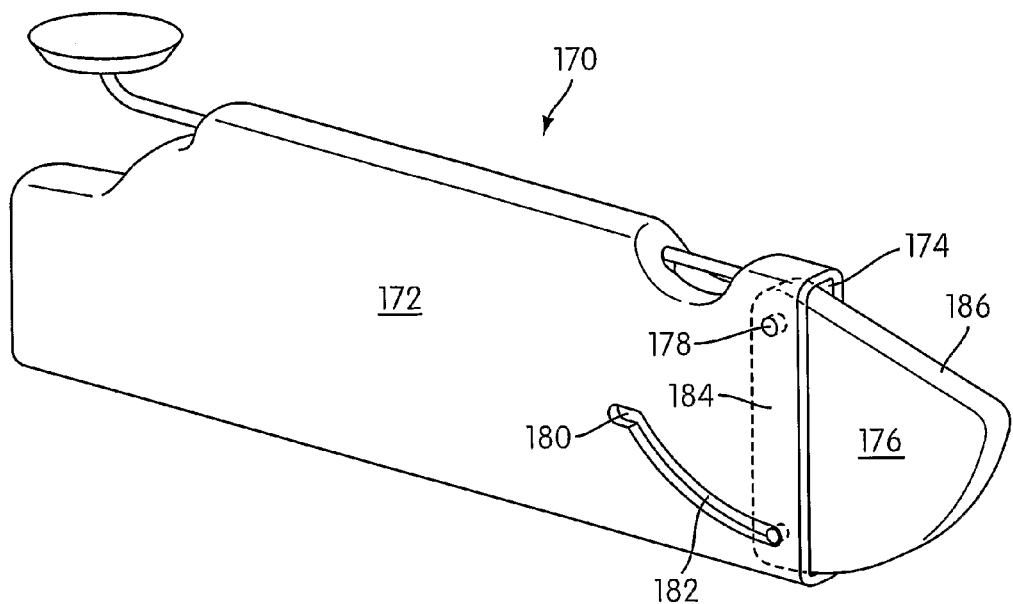
FIG. 13 is a perspective view of an adaptable visor according to an exemplary embodiment.
Figure 14:
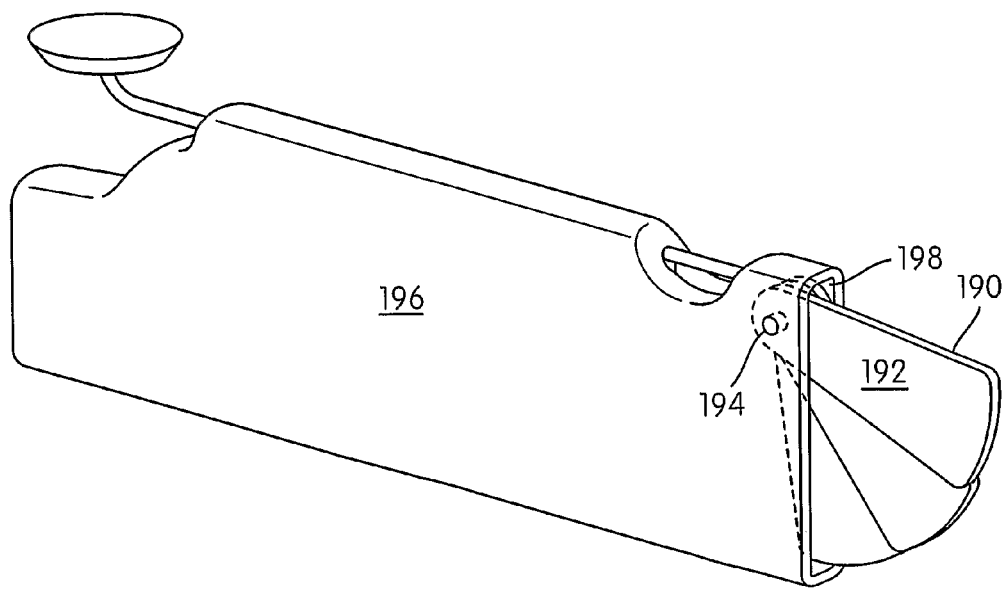
FIG. 14 is a perspective view of an adaptable visor according to an exemplary embodiment.

Referring now to FIGS. 13-14, further embodiments of an ear segment(s) for an adaptable visor for vehicles are shown. Referring to FIG. 13, a visor 170 is shown to include a body portion 172 having a recess 174 (e.g. pocket, etc.) at one or both lateral sides (shown for example at one lateral sides) and configured to receive an extendable ear segment 176. According to the illustrated embodiment, ear segment 176 may be one (or more) "pie-slice" shaped segment that is pivotally attached to body portion 172 at a pivot 178 and is deployable from recess 174 in body portion 172 to a use position to increase the visor coverage area, and may be sufficiently flexible to bend or deform as desired, and may include a frictional interaction with body portion 172 to remain in a desired position until repositioned by a user. According to a further alternative embodiment, ear segment 176 may be spring biased for deployment from recess 174, and may be activatable with a simple mechanism or catch, such as a "push-push" type catch or latch, and may include detents or other positioning structure, such as a notch 180 in a channel 182, for selectively deploying ear segment 176 to one or more positions relative to body portion 172. According to another embodiment, extendable ear segment 176 may be configured such that a portion 184 is fixed relative to visor body portion 172 and a side 186 is a pivotally movable fan-like member. The material therebetween may be made from a flexible material that can expand from the recess and contract (e.g. fold in an accordion-like manner into the recess) and may have sufficient flexibility to bend or otherwise deform to accommodate structures (e.g. A pillars, headliner panels, etc.) along a boundary of the packaging space.

Referring to FIG. 14, according to an alternative embodiment, an ear segment 190 may be provided as a "stack" of relatively thin, elongated panels 192 pivotally connected at one end to the body portion at a pivot 194 and capable of being "spread" in a fan-like manner from the body portion 196 to provide increased visor coverage area. Panels 192 may have a desired flexibility and may be "clamped" at the pivot-end such that panels 192 have a sufficient frictional interaction to remain in a deployed position outside visor body portion 196 until manually repositioned into the recess 198. According to another embodiment, the ear segment may be formed from a substantially inflexible material and configured to fold or collapse a sufficient amount to avoid other structures as the visor is repositioned or adjusted.

As shown in FIGS. 13 and 14, ear segments 176 and 190 are contained within a recess in the adaptable visor assembly when in the stowed position. According to alternative embodiments, one or both of ear segments 176, 190 may be positioned to rotate upon an exterior surface of the body portion of the adaptable visor assembly.

According to any embodiment, the outward surfaces (faces) of the body portion and ear segment(s) may be formed or provided with any desirable finish. For example, the body portion and ear segment(s) may have the same texture and/or color or be provided with different or "contrasting" textures and/or colors as may be desired to suit a particular vehicle interior trim scheme. The body portion and ear segment(s) may also be provided with a suitable covering or coating (e.g., cover material 32 shown in FIGS. 4-6) that provides a desired appearance and/or "feel" (e.g. leather, wood trim, fabric, vinyl, etc.). The body portion and/or ear segment(s) may also be provided with certain labels (e.g. placards, warnings, advisories, informational or promotional messages or displays, etc.) relating to such information as airbags, speed, emergency operation or response, vehicle or manufacturer insignia, etc.

The substrate material of the ear segment(s) may be made of any suitable material, including any of a variety of polymers (e.g., polypropylene, polyethylene, copolymers, etc.) or other materials such as rubber, vinyl, ABS plastic, etc. The ear segment(s) may be formed in any suitable operation such as injection molding, blow molding, vacuum forming, co-injection molding, etc. The substrate or core material of the ear segment(s) may be formed in any of a wide variety of shapes, sizes, and configurations. For example, the ear segment(s) may be contoured, curved or flat and rigid or flexible to provide (in connection with the body portion) additional sun-blocking capability that conforms to the interior packaging space available within the vehicle at the visor mounting location (e.g. along the contour of the headliner and between the A pillar and rearview mirror, etc.). As shown in FIGS. 1-14, the ear segment(s) are shown configured for rigid attachment to the body portion. However, according to alternative embodiments, the ear segment(s) may be movably coupled to the body portion for articulation between a position generally planar with the visor body and a position that is "angled" or "bent" with respect to the visor body.

The ear segment(s) may also be formed to include a variety of other features. For example, the ear segment(s) may be pre-molded to include a hinged or sliding cover; illumination devices (e.g. vanity lamps, map lamps, reading lamps, conversation lamps, etc.); storage devices, such as component 50 shown in FIG. 1, such as "ticket clips," pen/pencil holders, resilient retainer straps, etc.; storage compartments or bins (e.g. hinged, sliding, etc.) for items such as coin holders, etc.; internal pockets, such as for containing articles such as remote control devices, etc.

The ear segment(s) may be formed from multiple pieces (see FIG. 2) intended to fit together and include connecting structure for securing the pieces into a unitary whole. The connecting structure is shown to include posts 28 (or other suitable structure) provided on an inside face of the first and second pieces that are configured to abut one another when the second piece is fitted onto the first piece. According to the illustrated embodiment of FIG. 2, the first and second pieces are connected by heat-fusing (e.g. melting, welding, etc.) corresponding posts 28 on each portion of the ear segment to one another (e.g. by heat plating, etc.). According to other embodiments, the connecting structure may have any suitable form, such as ribs (not shown) provided along the inside faces of the first and second pieces (such as pieces 22, 24) that are configured to align with one another for heat-plating the ribs on the first and second pieces together. According to a further embodiment, the connecting structure may be in the form of ledge(s) (not shown) provided along the walls of a first piece (e.g., piece 22) configured to support the inner face of the second portion. According to alternative embodiments, the first and second pieces (and the ear segment and body portion) may be connected using any suitable technique, such as adhesive (e.g. hot glue, bonding agent, etc.), snap-fit (e.g. by interconnecting tabs and sockets, etc.), sonic welding, etc. The first and second pieces may also include alignment structure (not shown) intended to facilitate assembly of the first and second pieces into an ear segment. The alignment structure may have any suitable shape, size or location for facilitating assembly of the first and second pieces for interconnection by the connecting structure. According to an alternative embodiment, the connecting structure and the alignment structure may be combined into a single structure configured to facilitate alignment and connection of the first and second pieces. According to a further alternative embodiment, the alignment of the first and second pieces may be accomplished by manufacturing and assembly equipment configured to position the portions for assembly with each other.

According to alternative embodiments, the ear segment(s) may be customized for a desired application by providing a covering or fabric (similar to cover 32), such as a padding (e.g. foam, etc.) and/or a decorative trim material (e.g. vinyl, polyurethane, polyvinylchloride (PVC), a thermoplastic olefin (TPO), Santoprene, etc.) over the ear segment(s) to create a padded and/or upholstered visor product. The ear segment(s) may also be provided with rounded edges (e.g., as shown in FIG. 10) to meet head-impact criteria requirements. According to other alternative embodiments, the ear segment may be designed to include other useful features and be selectively removable from the body portion for use elsewhere (e.g. within or external to the vehicle). For example, the ear segment may be designed as a holder for objects (e.g. coins, tokens, electronic toll transmitters/receivers, medications, remote control transmitters, GPS tracking devices, compass, etc.) or have certain objects (e.g., component 50 shown in FIG. 1) integrated into the ear segment to suit an intended application. Such ear segments may be manufactured as stand-alone items commercially available through vehicle manufacturers, dealers, or after-market providers to increase or enhance the capability to customize the functionality of the ear segment to suit any of a wide variety of consumer market demands.

The construction and arrangement of the elements of the adaptable visor for vehicles as shown in the illustrated and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein (e.g., the ear segment(s) may be provided with any suitable color and/or texture scheme, and may be configured to interconnect to the visor using any suitable structure, and may be attached to form a rigid joint or a movable joint). For example, elements shown as integrally formed may be constructed of multiple parts or elements, the position of elements may be reversed or otherwise varied, and the nature or number of discrete elements or positions may be altered or varied (e.g. the connecting structure, alignment structure and positioning structure may be provided in any suitable shape, size and location, or may be combined with one another in any suitable combination). For example, the connecting structure or attachment structure may be arranged for a slide-lock, press-fit, snap-fit engagement, or may use suitable catches, latches or other coacting structures. It should be noted that the elements and/or assemblies of the adaptable visor for vehicles may be constructed from any of a wide variety of materials that provide sufficient strength or durability, including any of a wide variety of moldable plastic materials (such as high-impact plastic) in any of a wide variety of colors, textures and combinations. Other substitutions, modifications, changes and omissions may be made in the design, operating conditions and arrangement of the preferred and other exemplary embodiments without departing from the scope of the present inventions.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present inventions as expressed in the appended claims.

What is claimed is:

1. An adaptable visor assembly, comprising:
   a generally planar body portion having a first lateral end; and
   a first ear segment removably attachable to the body portion at the first lateral end via a first interface;
   wherein the first interface includes a projection configured to engage a receptacle when the first ear segment is attached to the body portion;
   wherein at least a portion of the first ear segment is flexible relative to the body portion when the first ear segment is attached to the body portion;
   wherein the projection includes a pair of recesses in the surface of the body portion at the first lateral end and the receptacle is a channel extending along an edge of the first ear segment; and
   wherein the channel is C-shaped.

2. The adaptable visor assembly of claim 1, wherein the projection also includes a plurality of teeth located on the first ear segment, the plurality of teeth being in biased engagement with the receptacle when the first ear segment is attached to the body portion.

3. The adaptable visor assembly of claim 2, wherein the plurality of teeth engage the receptacle in a snap fitting manner.

4. The adaptable visor assembly of claim 1, wherein the body portion comprises a first half attached to a second half.

5. The adaptable visor assembly of claim 1, wherein at least a portion of the first ear segment comprises an elastomeric material.

6. The adaptable visor assembly of claim 1, wherein the body of the first ear segment is generally coplanar relative to the body portion when the first ear segment is attached to the body portion.

7. The adaptable visor assembly of claim 1, wherein the body of the first ear segment is curved relative to the body portion when the first ear segment is attached to the body portion.

8. The adaptable visor assembly of claim 1, further comprising:
   a second ear segment;
   wherein the body portion includes a second lateral end; and
   wherein the second ear segment is removably attachable to the body portion at the second lateral end via a second interface.

9. The adaptable visor assembly of claim 1, further comprising:
   a second ear segment being different from the first ear segment in at least one of a size and a shape;
   wherein the second ear segment is removably attachable to the body portion via the first interface.

* * * * *